Dec. 6, 1966 K. G. MICHEL 3,290,422
METHOD OF PRODUCING A DISPENSING CONTAINER
Filed Dec. 28, 1962 2 Sheets-Sheet 1
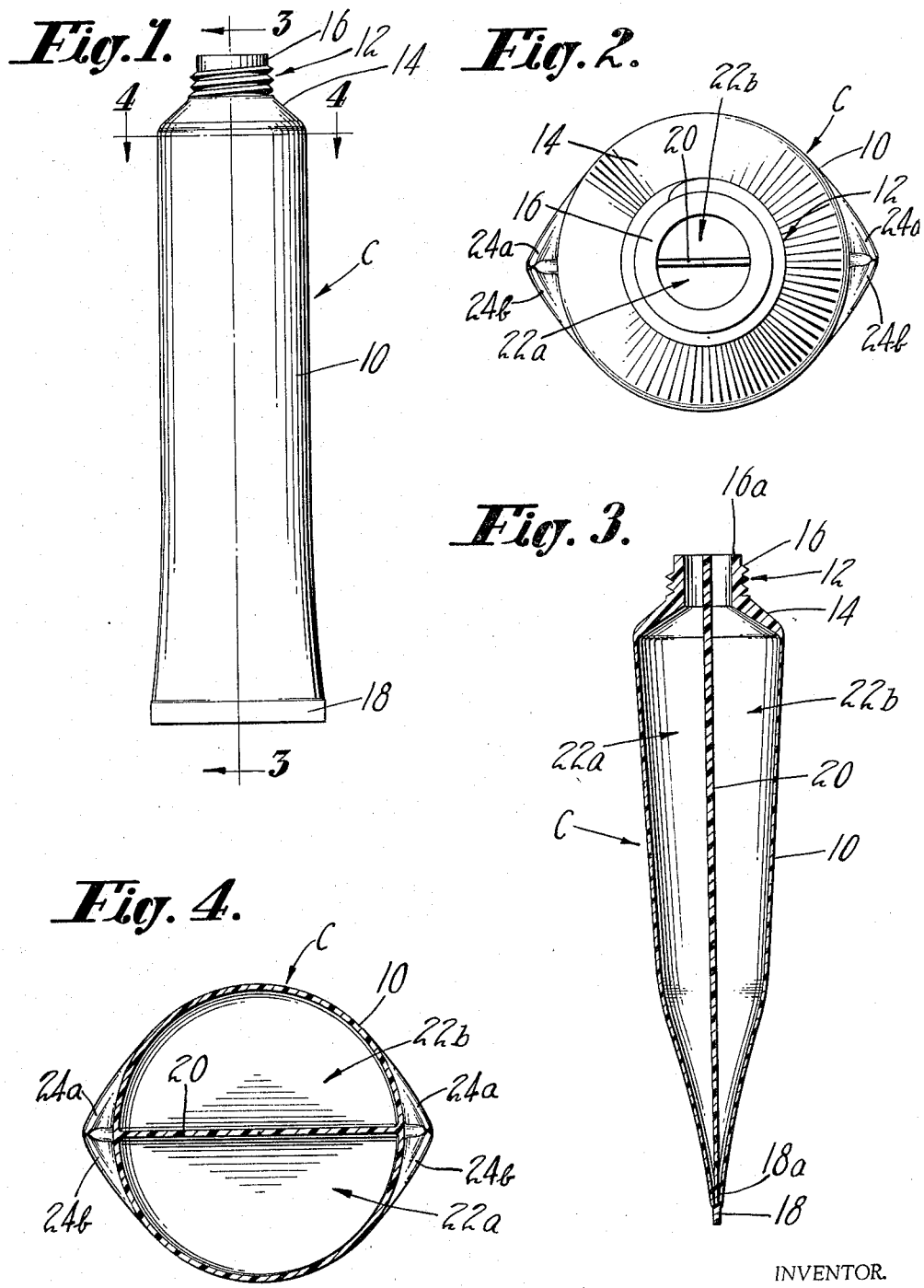
INVENTOR.
KENNETH GEORGE MICHEL
BY Bertram H. Claeboe
George W. Reiber
ATTORNEYS

3,290,422
METHOD OF PRODUCING A DISPENSING CONTAINER
Kenneth George Michel, Far Hills, N.J., assignor to American Can Company, New York, N.Y., a corporation of New Jersey
Filed Dec. 28, 1962, Ser. No. 247,981
4 Claims. (Cl. 264—259)

The present invention relates broadly to the container art, and is more particularly concerned with a novel method and article featuring the provision of a collapsible dispensing tube having a longitudinally extending separator member bonded to the side walls thereof and dividing the tube interior into a pair of independent compartments for containing chemically dissimilar substances.

Various applications exist for which there are required two or more materials combined at the time of usage and applied to a surface to be treated. Illustratively, in the adhesives art there is currently available epoxy cements which are formulated at the site by first applying the adhesive component to the parts from one container or tube, and next adding to the applied component a hardening agent from a second tube. Clearly, this necessitates duplicate containers, and the opening and closing of both at time of use.

It has been proposed in partial resolution of the foregoing problem to simultaneously blow mold two separate parisons so as to provide a unitary container formed of two fused container bodies each having its own pouring spout. Likewise, it is possible to heat seal or otherwise weld together two separate tubes along their side walls. While either of these approaches may be advantageous from the standpoint of reducing the possibility of losing one container, it is also manifest that neither eliminates the requirement of opening and closing two independent dispensing orifices during use thereof.

An important aim of the present invention therefore relates to providing a collapsible dispensing container having a single dispensing spout in common communication with a plurality of separate chambers within the container and which are defined by an axially extending diaphragm fused to the container side walls.

An object of this invention lies in the provision of a method of producing a container of the foregoing character, featuring fusing the diaphragm to the container side walls and formation and fusion of the container headpiece to the tubular body in a single operation.

Another aim of the instant invention relates to providing a collapsible dispensing tube having body and neck portions subdivided by an internal separator member extending diametrally thereacross and axially therealong in bonded relation to said neck and body portions.

A further object of this invention is to provide a process of producing a collapsible tube with an internal diametral diaphragm extending axially therealong, in which a diametrally slit mandrel with tubular thermoplastic sleeve thereon is introduced into a mold cavity and thermoplastic material is then caused to fill the cavity and the slot in the mandrel, thereby in one operation forming the headpiece and fusing the same to the sleeve while also fusing the material in the mandrel slot to said sleeve to provide the diaphragm.

Other objects and advantages of the invention will become more apparent as the description proceeds, particularly when taken in connection with the accompanying drawings.

In the drawings, wherein like numerals are employed to designate like parts throughout the same:

FIGURE 1 is an elevational view of a collapsible dispensing container constructed in accordance with the principles of this invention;

FIGURE 2 is a top plan view thereof;

FIGURE 3 is a longitudinal sectional view taken substantially along the line 3—3 of FIGURE 1;

FIGURE 4 is a transverse sectional view taken substantially along the line 4—4 of FIGURE 1.

Figure 5:
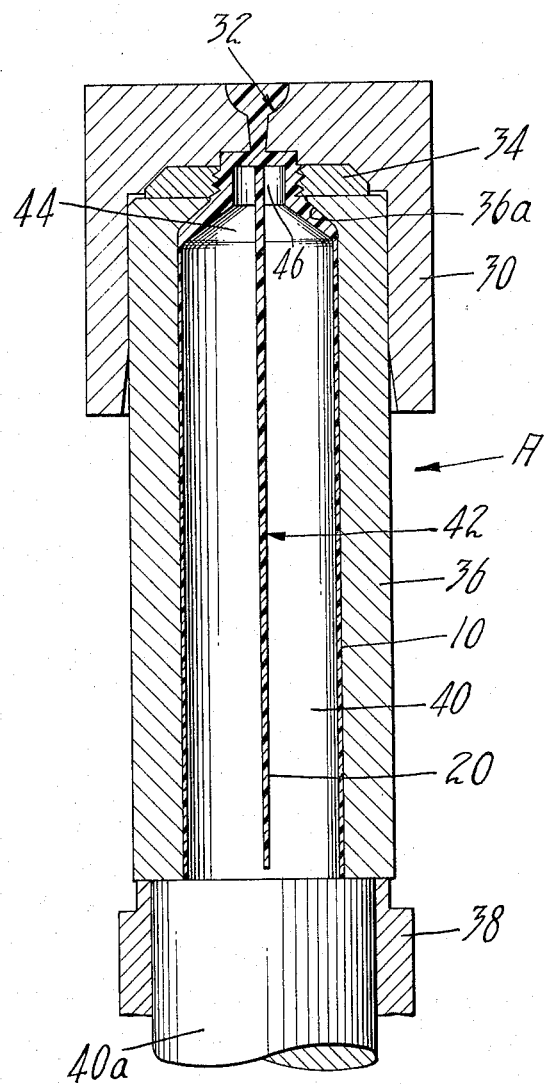
FIGURE 5 is a sectional view through salient portions of molding apparatus which may be employed to practice the process of this invention.

Referring now to FIGURES 1 to 4 of the drawings, a collapsible dispensing container embodying the novel concepts of this invention is designated generally therein by the legend C and comprises a tubular body portion 10 mounting at one end a headpiece 12 which includes a sloping breast portion 14 integral with an upstanding neck portion 16 externally threaded or otherwise equipped with interengaging means for receiving a suitable closure (not shown). The opposite end of the body portion, as indicated at 18, is sealed by heat and pressure or by other techniques known to the art.

The container C may be constructed of metallic or plastic materials, or a combination thereof in which the body portion 10 is provided by a laminate of metallic foil faced by thermoplastic layers. Lead or aluminum are suitable in the formation of an all-metal tube, and in the family of thermoplastics a polyolefin such as polyethylene is preferred. However, substitutes therefor are polyamides, polyesters, vinyl polymers and copolymers, polymers of vinylidene chloride, polystyrene, and polypropylene and its copolymers.

The collapsible dispensing tube as thus far described is conventional in the art, and particularly from FIGURES 3 and 4 it will now be observed that by this invention the container C importantly embodies a relatively thin separator member 20 disposed centrally of the tube body, breast and neck portions 10, 14 and 16 and extending diametrally thereacross in fused relation thereto. It is further to be noted from FIGURE 3 that the separator member 20 subdivides the interior of the container C into a pair of compartments 22a and 22b, and that the separator or central wall member extends longitudinally throughout the axial length of the container from the terminal end of the tube neck, as indicated at 16a, to and within the sealed opposite end of the tube body, as indicated at 18a. Thereby the compartments 22a and 22b are isolated or separated one from the other and products of differing chemical properties contained therein merge or mix only upon discharge from the common dispensing orifice. It is also believed manifest in this connection that the closure means for the container could embody a rotatable disc therein of the character used in certain condiment dispensers, whereby first one product and then the other may be exuded from the orifices of the tube shown.

It is further to be observed from FIGURES 2 and 4, by reason of the inherent width of the diametral diaphragm 20, that the tube body material in the region of the sealing area 18 will be folded against itself in pleated fashion. The pleats thus formed are indicated in these views by the legend 24a and 24b.

The collapsible dispensing container C of this invention, featuring therein a diametrally disposed separator member 20 extending axially between the opposite ends thereof, may be produced by various techniques, however, it is presently preferred that the divider 20 be fused to the tube body 10 and headpiece 12 in the same operation in which the headpiece is formed and fused to the tube body. Illustrative apparatus for proceeding in this novel manner is shown in FIGURE 5, wherein the molding apparatus is generally indicated by the legend A.

The apparatus A comprises a die housing 30 having a passage 32 provided therein for the injection of thermoplastic material into a cavity defined by a plurality of resiliently urged thread plates 34 which are inwardly and upwardly movable or slidable to the closed position shown under action of a sleeve member 36 seated at its opposite end upon a collar member 38 reciprocally receiving pusher portion 40a of mandrel or male forming member 40. The mandrel has an elongated longitudinally extending channel in the form of a slot 42 provided therein which terminates upwardly of its lower end and extends axially throughout the remainder of the length of the mandrel, passing through breast and neck forming portions 44 and 46 thereof.

In operation of the apparatus A of FIGURE 5, and following generally the teachings in Strahm Patent No. 2,673,374, the thread plates 34 are closed by action of the sleeve member 36. A thermoplastic sleeve is located upon the mandrel body portion with one end of the sleeve extending slightly beyond the juncture of the body and breast portion of the mandrel. The mandrel and thermoplastic sleeve thereon are then moved into the sleeve member 36 of the molding apparatus until the extending or overhanging thermoplastic sleeve portion abuts against sloping die surface 36a. Molten thermoplastic material is thereafter injected through passage 32 in the die housing 30 and flows along the diametral slot 42 in the mandrel 40, simultaneously filling the breast forming and neck forming cavities between the mandrel portions 44 and 46 and the sloping surface 36a and thread plates 34. The thermoplastic material in the named cavities thereby is formed into the configuration of the tube headpiece 12 of FIGURE 1 while being fused to the extending thermoplastic sleeve portion. Generally simultaneously, the thermoplastic material in the mandrel slot 42 bonds or fuses to the body portion of the thermoplastic sleeve, as in FIGURE 4, and also across the breast and neck portions of the tube, as in FIGURES 2 and 3.

After the thermoplastic material has set, the mandrel 40 and pusher portion 40a may be lowered and the die housing 30 raised to release the thread plates 34, whereupon the compartmented tube body may be removed from the apparatus A. In this regard it may be noted from FIGURE 5 that the mandrel slot 42 is tapered from its upper to its lower end, being relatively wider in the region of the breast and neck portions, in order to facilitate removal of the completed tube from the tooling. Following this, and with a closure (not shown) on the tube headpiece 12 and products in the compartments 22a and 22b, the tube body is heat sealed or otherwise closed at its lower end with the depending end of the separator included in the seam, as indicated at 18a in FIGURE 3.

It is thus to be seen that applicant has provided a compartmented tube and method of producing the same in which a diametrally disposed and longitudinally extending separator member is integrated with the tube body portion and headpiece mounted thereon in the same operation in which the headpiece is molded and bonded to the tube body. Substantial manufacturing economies are thereby attained, as for example, the thermoplastic sleeve may be printed on a conventional mandrel prior to forming the separator and headpiece, rendering unnecessary a slotted printing mandrel to accommodate the web or separator 20. Further, as to the article itself, substances of different chemical properties may be packaged in a single container isolated from one another, and after removal of the closure, dispensed from a single spout. The products may be exuded from the container in unison, merging as they issue from the orifices, or as was earlier noted, a cap may be employed which will permit one orifice to be closed while product is being dispensed from the other.

Fabrication of the novel dispensing container C of this invention has been described in connection with the preferred injection molding technique illustrated in FIGURE 5, although it may be found that compression molding can be used or that the separator may be heat sealed to a flat thermoplastic strip which is then coiled and heat sealed followed by heading in any desired manner, as by attachment of a separate headpiece. Further, the container C may be produced by extruding a continuous length of tubing with central separator therein, severing the tubing into the requisite lengths, attaching to the separator a pre-formed headpiece having a longitudinally extending bottom groove therein, and heat sealing the marginal portion of the tube body to the skirt of the headpiece. Also, it is within the contemplation of the instant invention to provide an extruded tube body with integral separator upon an axially slit mandrel of the general character shown in FIGURE 5, then cut from a heated thermoplastic band a disc by means of a surrounding sleeve, and thereafter bond and form the headpiece from the disc to the tube body and separator. These and other modifications may of course be effected without departing from the novel concepts of this invention.

I claim:
1. A method of producing a compartmented collapsible dispensing container, which comprises introducing a male forming member having a longitudinally extending channel therein and a tubular sleeve thereon into a mold cavity, and flowing molten material into said channel and into said cavity and substantially simultaneously fusing said material in said channel to the inner surface of said sleeve along at least two lines of contact extending axially the entire length of said sleeve to form a separate wall while shaping said material in said cavity and fusing the same to one end of said sleeve to form it into a headpiece.

2. A method of producing a thermoplastic compartmented collapsible dispensing container, which comprises providing a forming member having a generally cylindrical body portion, a sloping breast portion and an upstanding neck portion with a channel extending longitudinally through said body and breast portions, locating upon said forming member a thermoplastic sleeve with one end thereof extending beyond said breast portion, introducing said forming member with sleeve thereon into a mold cavity, and introducing molten thermoplastic material into said cavity to form a portion of said material to the configuration of a headpiece and bond the same to said extended one end of said sleeve while flowing another portion of said material along said channel and fusing the same to said headpiece and to the sleeve body surrounding said slot to provide a transversely disposed and axially extending separator in said container.

3. A method of producing a container as defined in claim 6, in which there is added the step of sealing the opposite ends of said sleeve and said separator one to the other whereby said separator is received in and gripped by said opposite end of said sleeve.

4. A method of producing a compartmented collapsible dispensing container comprising the steps of:
holding a preformed thermoplastic sleeve,
forcing a quantity of molten thermoplastic toward one end of said sleeve, guiding a portion of said molten thermoplastic into contact with said one end of said sleeve, shaping said portion of said molten thermoplastic into a headpiece simultaneously forcing another portion of said molten thermoplastic axially through the interior of said sleeve while shaping said latter portion into the form of an integral separator wall extending from said headpiece into said sleeve in contact with the inner surface of said sleeve to divide said sleeve into compartments, solidifying said molten thermoplastic into a headpiece bonded to one end of said sleeve and an integral separator wall bonded at its edges to the inner surface of said sleeve.

References Cited by the Examiner

UNITED STATES PATENTS

| | | | |
|---|---|---|---|
| 1,363,064 | 12/1920 | Slegath | 222—94 |
| 1,894,115 | 1/1933 | Murphy | 222—94 |
| 2,347,737 | 5/1944 | Fuller | 18—47.5 |
| 2,724,863 | 11/1955 | Gudge et al. | 264—259 X |
| 2,923,975 | 2/1960 | Voumard et al. | |
| 2,947,035 | 8/1960 | Baker | 264—271 |
| 2,983,959 | 5/1961 | Shapero et al. | 18—47.5 |

FOREIGN PATENTS

| | | |
|---|---|---|
| 571,175 | 2/1959 | Canada. |
| 566,366 | 8/1957 | Italy. |

ROBERT F. WHITE, *Primary Examiner.*

LOUIS J. DEMBO, ALEXANDER H. BRODMERKEL, *Examiners.*

H. S. LANE, L. S. SQUIRES, *Assistant Examiners.*